US011190556B2

(12) United States Patent
Meiyappan et al.

(10) Patent No.: US 11,190,556 B2
(45) Date of Patent: Nov. 30, 2021

(54) SYSTEMS AND METHODS FOR DATA MANAGEMENT

(71) Applicant: Bose Corporation, Framingham, MA (US)

(72) Inventors: Somasundaram Meiyappan, Chennai (IN); Nathan Blagrove, Wayland, MA (US)

(73) Assignee: Bose Corporation, Framingham, MA (US)

( * ) Notice: Subject to any disclaimer, the term of this patent is extended or adjusted under 35 U.S.C. 154(b) by 292 days.

(21) Appl. No.: 16/422,410

(22) Filed: May 24, 2019

(65) Prior Publication Data

US 2020/0374326 A1 Nov. 26, 2020

(51) Int. Cl.
*H04L 29/06* (2006.01)
*H04B 1/3827* (2015.01)
*G06F 3/16* (2006.01)
*H04M 1/72412* (2021.01)

(52) U.S. Cl.
CPC .......... *H04L 65/1086* (2013.01); *G06F 3/167* (2013.01); *H04B 1/385* (2013.01); *H04M 1/72412* (2021.01)

(58) Field of Classification Search
USPC ........................................................ 709/231
See application file for complete search history.

(56) References Cited

U.S. PATENT DOCUMENTS

| 10,013,999 | B1* | 7/2018 | Fadell | H04R 1/028 |
| 2004/0137969 | A1* | 7/2004 | Nassimi | H04M 1/6058 |
| | | | | 455/575.2 |
| 2016/0044151 | A1* | 2/2016 | Shoemaker | H04M 19/02 |
| | | | | 455/556.1 |
| 2016/0357510 | A1* | 12/2016 | Watson | G06F 3/165 |

* cited by examiner

*Primary Examiner* — Hermon Asres
(74) *Attorney, Agent, or Firm* — Bond, Schoeneck & King, PLLC (57) ABSTRACT

An audio system and method for data management including establishing a first connection between a first wearable audio device and a first peripheral device, the first wearable device or the first peripheral device being operational in a critical listening state and a non-critical listening state; establishing, when the first wearable audio device or the first peripheral device is in the critical listening state, a first data stream within the first connection, the first data stream established using a first communication protocol, the first communication protocol having an audio-centric data slot template; and, establishing, when the first wearable device or the first peripheral device is in the non-critical listening state, the first data stream within the first connection, the first data stream established using the first communication protocol, the first communication protocol having a voice-centric data slot template.

22 Claims, 8 Drawing Sheets

SYSTEMS AND METHODS FOR DATA MANAGEMENT

BACKGROUND

Aspects and implementations of the present disclosure are generally directed to systems and methods for managing communications between electronic devices, for example, wearable audio devices and peripheral devices.

SUMMARY OF THE DISCLOSURE

The present disclosure relates to systems and methods for managing bandwidth/bit rate allocation of data within bi-directional data connections and communications. In one example, the bi-directional communications simultaneously send and receive voice data and audio data. The present disclosure is directed to methods and systems for switching between data slot templates used in these communications to reallocate bandwidth/bit rates of information as needed by a user while the user is in a critical listening state or a non-critical listening state.

In one aspect there is provided a method of data management, the method including: establishing a first connection between a first wearable audio device and a first peripheral device, the first wearable device or the first peripheral device being operational in a critical listening state and a non-critical listening state; establishing, when the first wearable audio device or the first peripheral device is in the critical listening state, a first data stream within the first connection, the first data stream established using a first communication protocol, the first communication protocol having an audio-centric data slot template; and, establishing, when the first wearable device or the first peripheral device is in the non-critical listening state, the first data stream within the first connection, the first data stream established using the first communication protocol, the first communication protocol having a voice-centric data slot template.

In an aspect, the first wearable audio device or first peripheral device further comprises a first sensor arranged to receive a voice input.

In an aspect, the method further includes: transitioning the first wearable audio device or first peripheral device from the critical listening state to the non-critical listening state when the first sensor receives the voice input.

In an aspect, the transitioning occurs over a plurality of data frames.

In an aspect, the method further includes: decreasing, via an audio encoder of the first wearable audio device, a bit rate of a first audio data when the first sensor receives the voice input.

In an aspect, the audio-centric data slot template or the voice-centric data slot template comprises at least one slot corresponding to sensor data from another sensor located on or in the portable electronic device.

In an aspect, the audio-centric data slot template and the voice-centric data slot template comprise a plurality of data slots, where each data slot is associated with voice data obtained from a sensor on the first peripheral device or the first wearable audio device, or audio data obtained from the first peripheral device.

In an aspect, the audio-centric data slot template comprises a first data slot corresponding to a first audio data, a second data slot corresponding to a second audio data, and a third data slot corresponding to a first voice data.

In an aspect, the voice-centric data slot template comprises a first data slot corresponding to a first audio data, a second data slot corresponding to a first voice data, and a third data slot corresponding to a second voice data.

In an aspect, the first peripheral device includes a first processor and a first memory arranged to execute and store, respectively, a set of non-transitory computer readable instructions, the first memory further arranged to store the audio-centric data slot template and the voice-centric data slot template.

In an aspect, the first peripheral device is arranged to send a control packet to the first wearable audio device indicating that the first peripheral device is using the audio-centric data slot template or the voice-centric data slot template.

In an aspect, there is provided an audio system for managing data, the system including: a first wearable audio device and a first peripheral device, the first peripheral device arranged to connect, via a first connection, to the first wearable audio device, the first connection comprising a first data stream over a first protocol, the first data stream arranged to utilize a voice-centric data slot template or an audio-centric data slot template. The first peripheral device and the first wearable audio device are arranged to operate in a critical listening state or a non-critical listening state where the critical listening state corresponds with the audio-centric data slot template and the non-critical listening state corresponds with the voice-centric data slot template.

In an aspect, the first wearable audio device or first peripheral device further comprises a first sensor arranged to receive a voice input.

In an aspect, the first wearable audio device and the first peripheral device are arranged to transition from the critical listening state to the non-critical listening state when the first sensor receives the voice input.

In an aspect, the transition occurs over a plurality of data frames.

In an aspect, the first wearable audio device comprises an audio encoder, the audio encoder arranged to decrease a bit rate of a first audio data when the first sensor receives the voice input.

In an aspect, the audio-centric data slot template and the voice-centric data slot template comprise a plurality of data slots, where each data slot is associated with voice data obtained from a sensor on the first peripheral device or the first wearable audio device, or audio data obtained from the first peripheral device.

In an aspect, the audio-centric data slot template comprises a first data slot corresponding to a first audio data, a second data slot corresponding to a second audio data, and a third data slot corresponding to a first voice data.

In an aspect, the voice-centric data slot template comprises a first data slot corresponding to a first audio data, a second data slot corresponding to a first voice data, and a third data slot corresponding to a second voice data.

In an aspect, the audio-centric data slot template or the voice-centric data slot template comprises at least one slot corresponding to sensor data from another sensor located on or in the portable electronic device.

In an aspect, the first peripheral device includes a first processor and a first memory arranged to execute and store, respectively, a set of non-transitory computer readable instructions, the first memory further arranged to store the audio-centric data slot template and the voice-centric data slot template.

In an aspect, the first peripheral device is arranged to send a data from a control slot to the first wearable audio device indicating that the first peripheral device is using the audio-centric data slot template or the voice-centric data slot template.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems and methods for managing bandwidth/bit rate allocation of data within bi-directional data connections and communications. In one example, the bi-directional communications simultaneously send and receive voice data and audio data. The present disclosure is directed to methods and systems for switching between data slot templates used in these communications to reallocate bandwidth/bit rates of information as needed by a user while the user is in a critical listening state or a non-critical listening state.

Figure 1:
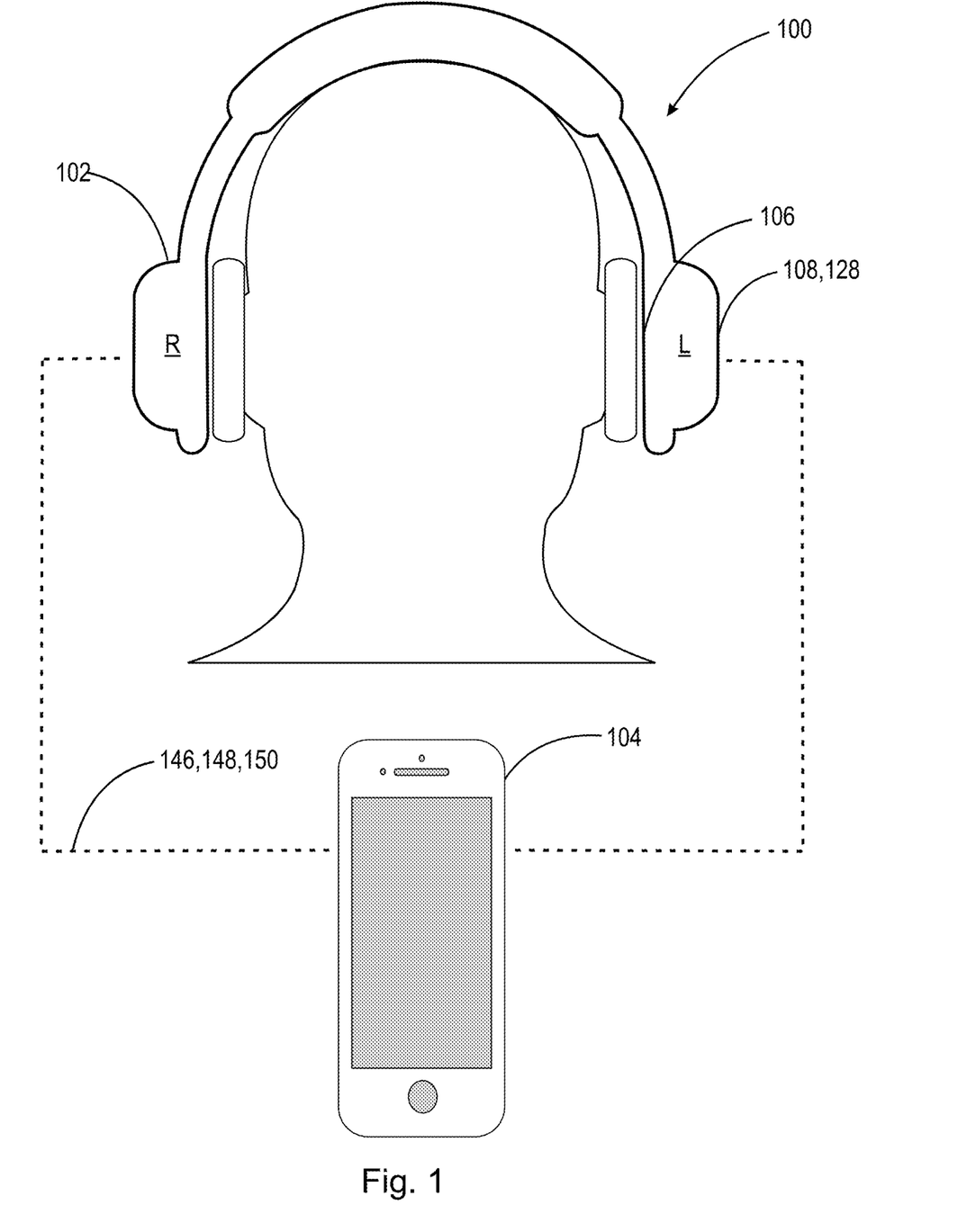
FIG. 1 is a schematic illustrated of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an around-ear headset, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

The following description should be read in view of FIGS. 1-3B. FIG. 1 is a schematic view of audio system 100 according to the present disclosure. Audio system 100 includes a first wearable audio device 102 and first peripheral device 104 discussed below. Although illustrated in FIG. 1 as a pair of over-ear headphones, it should be appreciated that first wearable audio device 102 could be any type of headphone or wearable device capable of establishing a wireless or wired data connection with first device 104. It should also be appreciated that first wearable audio device 102 may include a pair of over-ear headphones having a right ear cup R and a left earcup L as will be discussed below. Furthermore, during operation of audio system 100, both audio data 132 (discussed below) and voice data 130 (discussed below) can be provided to the user through the right earcup R and/or the left ear cup L.

Figure 3A:
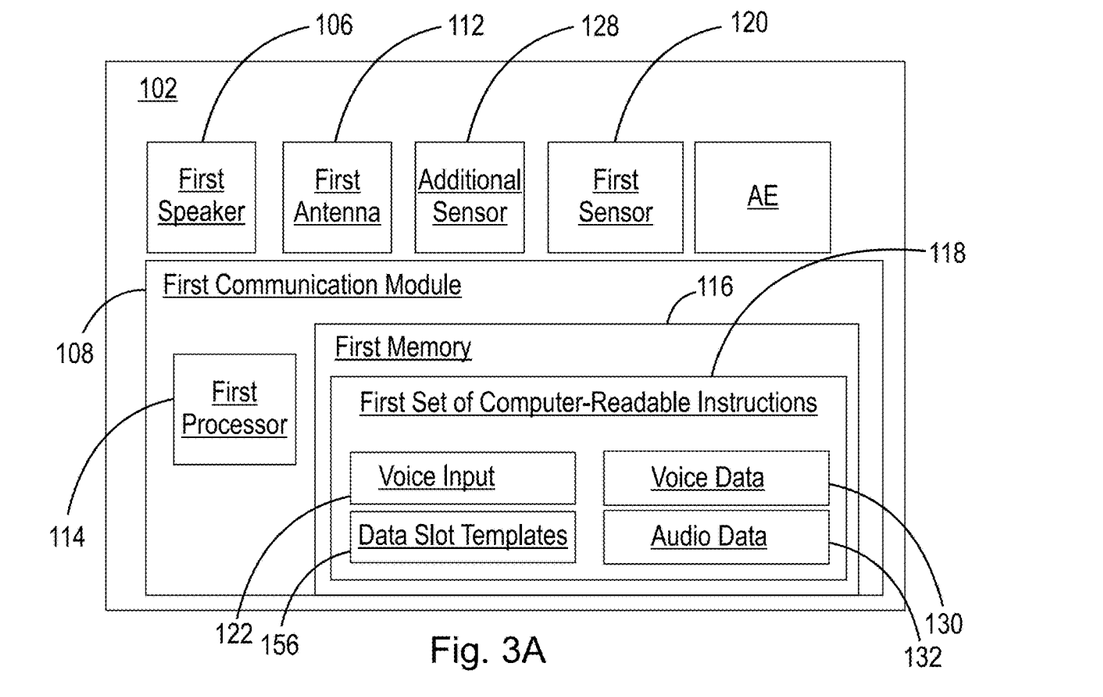
FIG. 3A is a schematic illustration of the electronic components of a wearable audio device according to the present disclosure.
Figure 3B:
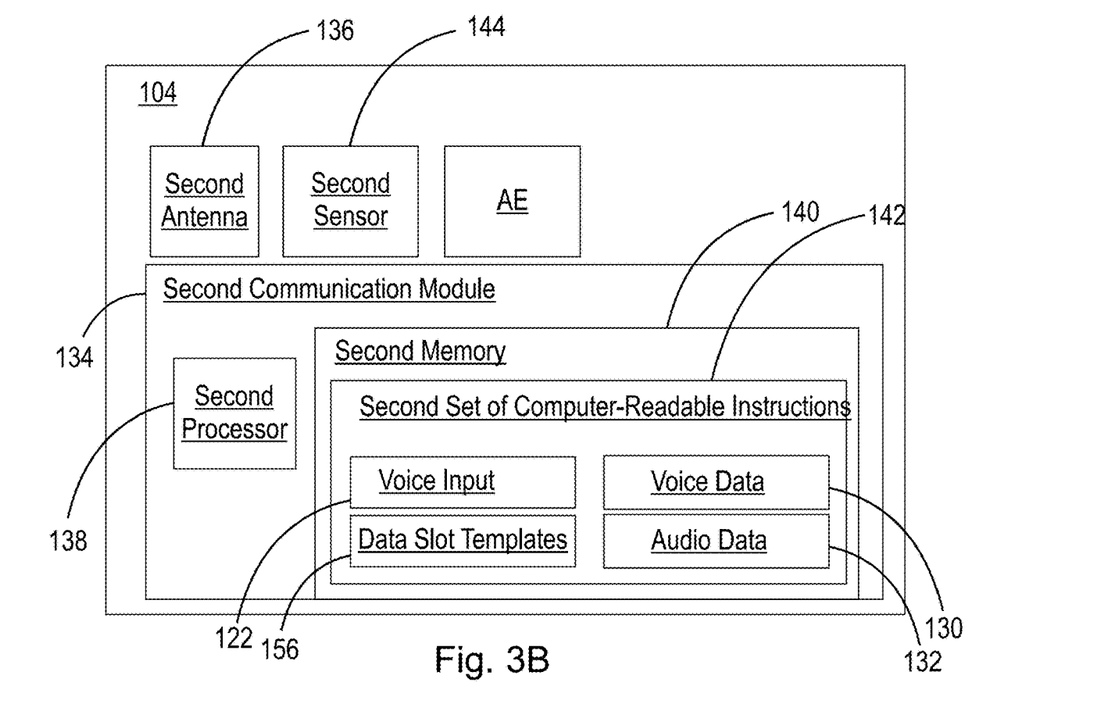
FIG. 3B is a schematic illustration of the electronic components of a peripheral device according to the present disclosure.

First wearable audio device 102 includes at least one speaker, i.e., first speaker 106 and first communication module 108 (shown in FIGS. 1 and 3A). Although not illustrated, it should be appreciated that each earcup of first wearable audio device 102 may have a respective speaker. First speaker 106 is arranged to produce first audio signal 110 (not shown) proximate at least one ear of a user in response to audio data of first data stream 150, discussed below, which is sent and/or received from first communication module 108. First communication module 108 is arranged to send and/or receive data via an antenna, e.g., first antenna 112 as shown in FIG. 3A. The data sent and/or received can be, e.g., audio data from first data stream 150 (discussed below) or data relating to voice input 122 (shown in FIG. 3A) sent and/or received from a plurality of external devices, e.g., first device 104. It should be appreciated, that first communication module 108 can be operatively connected to processor 114 (shown in FIG. 3A) and first memory 116 (shown in FIG. 3A) operatively arranged to execute and store a first set of non-transitory computer-readable instructions 118 (shown in FIG. 3A), as well as a battery or other power source (not shown).

Furthermore, first wearable audio device 102 includes first sensor 120 arranged to receive a voice input 122 (shown in FIG. 3A) from a user. As will be discussed below in the operation of system 100, first sensor 120 can be in an active state 124 (not shown) or an inactive state 126 (not shown). When in active state 124, first sensor 120 is arranged to receive voice input 122 and provide voice input 122 to first communication module 108. First sensor 120 is intended to be a microphone arranged on, in, or proximate to first wearable audio device 102; however, it should be appreciated that first sensor 120 can be any sensor capable of detecting the presence or absence of human speech of a user, e.g., a Voice Activity Detection (VAD) sensor. In one example, an additional sensor 128 (show in FIG. 3A) is provided, where additional sensor 128 is located on, in, or in proximity to first wearable device 102, could also be selected from: a mechanical button, a touch capacitive sensor, a slidable switch, a pressure or deformation sensor, an Electrooculography (EOG) sensor, an Electromyography (EMG) sensor, an Electrocardiogram (EKG/ECG) sensor, a piezoelectric sensor, an electrically active film, Voice Activity Detection (VAD) sensor, or any other sensor that can translate and transmit physiological events that take place on or in a user's body to wearable audio device 102. It should be appreciated that this additional sensor could be used independently or in conjunction with first sensor 120 to switch first wearable audio device 102 from the inactive state 126 to the active state 124.

First sensor 120 is arranged to obtain voice data 130 (schematically shown in FIGS. 3A and 3B) and relay voice data 130 to first communication module 108. Voice data 130 can be utilized to switch first sensor 120 (or second sensor 144 of first device 104, discussed below) from an inactive state 126 (not receiving and/or recording a voice input, i.e., voice input 122) to an active state 124 capable of receiving and/or transmitting voice input 122 to, e.g., first memory 116 of first wearable audio device 102. In one example, if first sensor 120 or additional sensor 128 detects sufficient sound energy levels from a user's speech or detects sufficient motion of a user's jaw or head that would indicate that the user is speaking, first sensor 120 is arranged to communicate with first communication module 108 to switch first sensor 120 from a default inactive state 126 to an active state 124 capable of receiving and transmitting first voice input 122 and voice data 130 to, e.g., first memory 116 so that it may subsequently be utilized by system 100 over the various connections described below. It should be appreciated that first sensor 120 or second sensor 144 (shown in FIGS. 2 and 3B) can be utilized to obtain voice input 122 and voice data 130. In some examples, first sensor 120 or second sensor 144 can be in an "always on" or always active state. Additionally, first communication module 108 is further arranged to send and receive audio data 132. Audio data 132 is intended to contain information which can be utilized by speaker 106 to produce audio signal 110, for example, music data or data relating to the voice of another person received over a telephone call or a video call.

Figure 2:
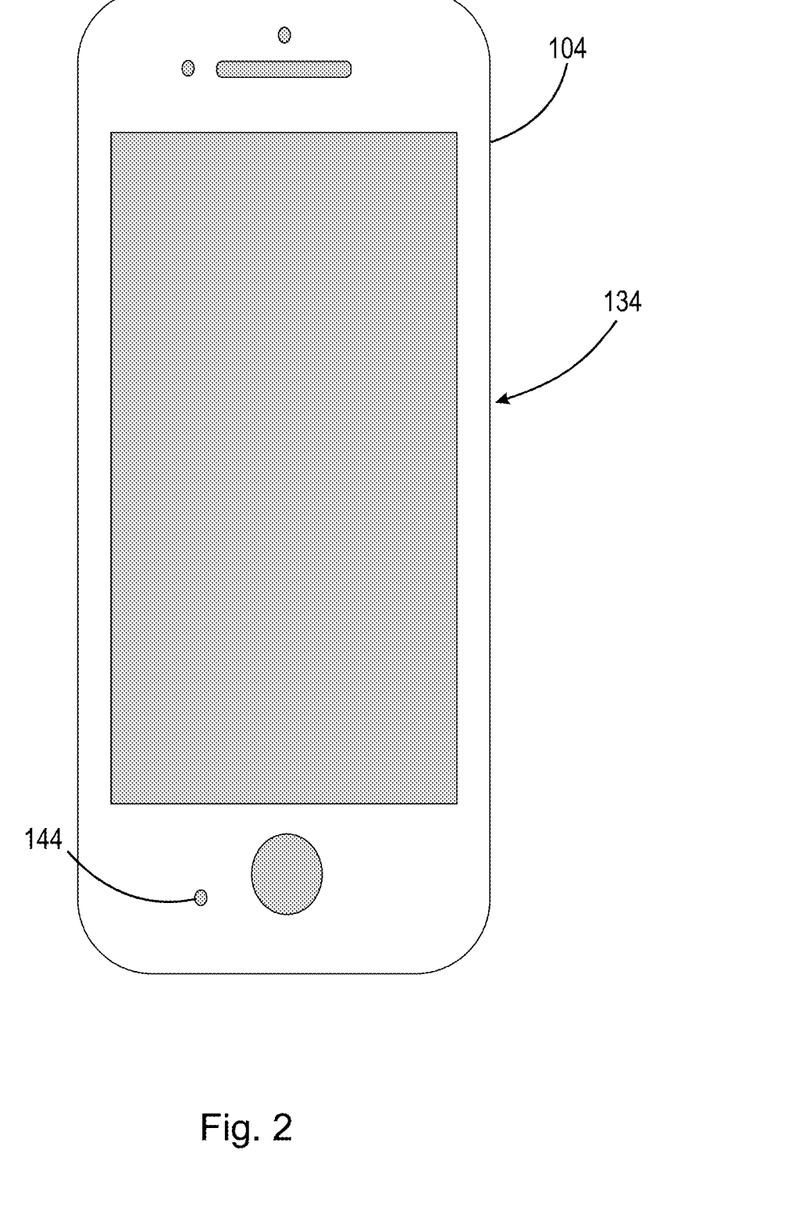
FIG. 2 is a schematic illustration of a peripheral device according to the present disclosure.

FIG. 2 illustrates a front schematic view of first device 104 according to the present disclosure. First device 104 includes second communication module 134 (shown in FIG. 3B) arranged to send and/or received data, e.g., audio data 132 related to first data stream 150 (discussed below) or data related to first voice input 122, via a second antenna 136 (shown in FIG. 3B). First device 104 further includes second processor 138 (shown in FIG. 3B) and second memory 140 (shown in FIG. 3B) arranged to execute and store a second set of non-transitory computer-readable instructions 142 (shown in FIG. 3B). Additionally, first device 104 can include a second sensor, i.e., second sensor 144 arranged to receive first voice input 122.

First communication module 108 of first wearable audio device 102 and/or second communication module 134 of first peripheral device 104 are arranged to establish a simultaneous bi-directional communication connection, i.e., first connection 146, to send voice data 130 and audio data 132 between first wearable audio device 102 and first peripheral device 104. The term "bi-directional" is intended to mean a single connection, protocol, or data stream that simultaneously transfers voice data 130 and audio data 132 between two devices. First connection 146 between first wearable audio device 102 and first peripheral device 104 is established via a first protocol, i.e., first communication protocol 148. It should be appreciated that first communication protocol 148 can be established using any wired or wireless protocols known in the art, for example, first communication protocol 148 can be selected from: a Bluetooth Classic protocol (i.e., Bluetooth Basic Rate/Enhanced Data Rate (BR/EDR)), a Bluetooth Low-Energy (BLE) protocol, a ZigBee protocol, a Wi-Fi (IEEE 802.11) protocol, Near-field Magnetic Induction (NFMI), Near-Field Electromagnetic Induction (NFEMI), or any other protocol for establishing a wireless connection between first wearable audio device 102 and first peripheral device 104. Additionally, first communication protocol 148 can include multiple profiles arranged to allow for the bi-directional communication connection discussed herein, where the profiles are selected from: Advanced Audio Distribution Profile (A2DP), Attribute Profile (ATT), Audio/Video Remote Control Profile (AVRCP), Basic Imaging Profile (BIP), Basic Printing Profile (BPP), Common ISDN Access Profile (CIP), Cordless Telephony Profile (CTP), Device ID Profile (DIP), Dial-up Networking Profile (DUN), Fax Profile (FAX), File Transfer Profile (FTP), Generic Audio/Video Distribution Profile (GAVDP), Generic Access Profile (GAP), Generic Attribute Profile (GATT), Generic Object Exchange Profile (GOEP), Hard Copy Cable Replacement Profile (HCRP), Health Device Profile (HDP), Hands-Free Profile (HFP), Human Interface Device Profile (HID), Headset Profile (HSP), Intercom Profile (ICP), LAN Access Profile (LAP), Mesh Profile (MESH), Message Access Profile (MAP), OBject EXchange (OBEX), Object Push Profile (OPP), Personal Area Networking Profile (PAN), Phone Book Access Profile (PBAP, PBA), Proximity Profile (PXP), Serial Port Profile (SPP), Service Discovery Application Profile (SDAP), SIM Access Profile (SAP, SIM, rSAP), Synchronization Profile (SYNCH), Synchronization Mark-up Language Profile (SyncML), Video Distribution Profile (VDP), Wireless Application Protocol Bearer (WAPB), iAP (similar to SPP but only compatible with iOS), or any suitable Bluetooth Classic profile or Bluetooth Low-Energy profile that is capable of establishing the bi-directional communications discussed herein.

Figure 5:
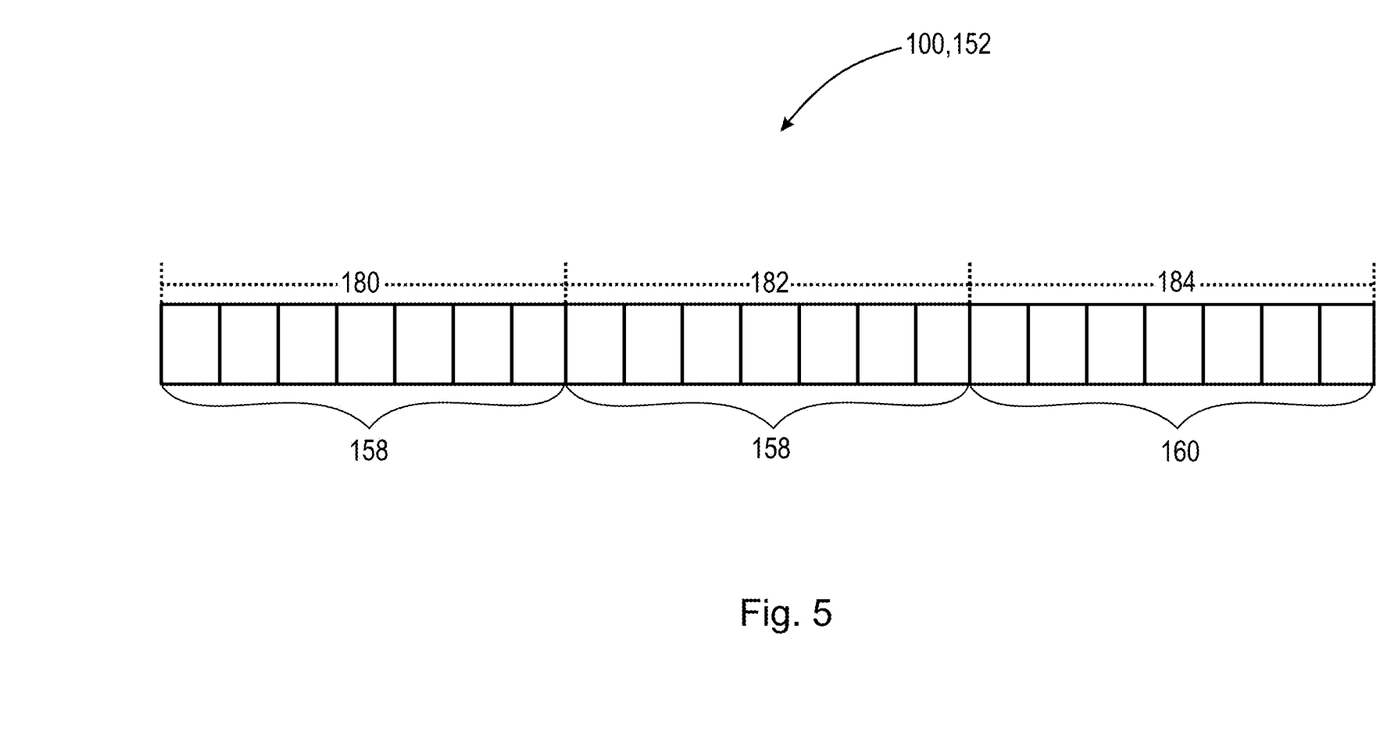
FIG. 5 is a schematic illustration of a plurality of data slot templates over a plurality of data slot frames according to the present disclosure.

Audio system 100 is arranged to transmit data, e.g., voice data 130 and/or audio data 132, via a first data stream 150 established between first wearable audio device 102 and first peripheral device 104 using, where the first data stream 150 is established over first connection 146 and the first connection 146 utilizes first communication protocol 148. Within first data stream 150, the wireless communications sent and received between first wearable audio device 102 and first peripheral device 104 with first communication protocol 148 contain a plurality of packets of information, i.e., discrete sets of data over a plurality of frames, i.e., plurality of data frames 152 (shown in FIG. 5). Each data frame includes a predefined number of slots, i.e., plurality of data slots 154, where each slot of plurality of data slots 154 can correspond to a predefined type of data. For example, each slot may include or be associated with one of: audio data 132 corresponding to a left ear cup L, audio data 132 corresponding to a right earcup R, voice data 130 corresponding to a left earcup L, voice data 130 corresponding to a right earcup R, or control information. Each potential combination or configuration of these slot types defines a data slot template of a plurality of data slot templates 156 (shown in FIGS. 3A and 3B). Additionally, a data slot template with a fixed number of data slots in any given data frame has a limited bit rate, i.e., the maximum bit rate of total information transferred corresponds directly to the total number of data slots in the template. Furthermore, in a data slot template with a fixed number of data slots in a bi-directional communication connection, e.g., first connection 146, the bit rate corresponding to voice data 130 and audio data 132 is also limited by the number of slots assigned to each data type. Thus, by increasing the number of slots within a given data slot template associated with audio data 132, the bit rate of audio data 132 increases. Similarly, by increasing the number of slots within a given data slot template associated with voice data 130, the bit rate of voice data 130 increases. Alternatively, the bit rates within each slot can be modified, e.g., in a data slot template with a fixed number of data slots in a bi-direction communication connection, i.e., first communication connection 146, it may be desirable to limit the maximum bit rate within the slots corresponding to voice data 130, or limit the maximum bit rate within the slots corresponding to audio data 132, for example in the critical listening state 176 and the non-critical listening state 178, discussed below. The increase or decrease in bit rate of any given piece of data or any data within any given slot discussed herein, may be implemented by an audio encoder AE (shown in FIGS. 3A-3B) within, on, or in connection with first wearable audio device 102 or first peripheral device 104.

In one example, first memory 116 of first wearable audio device 102 and/or second memory 140 of first peripheral device 104 are arranged to store a plurality of data slot templates 156. Each data slot template of the plurality of data slot templates 156 is intended to correspond to a different slot configuration relating to different potential bandwidth/bit rate allocations within first communication protocol 148, as will be discussed below. Plurality of data slot templates 156 can include an audio-centric data slot template 158 and a voice-centric data slot template 160. Audio-centric data slot template 158 corresponds to a potential bit rate allocation where a larger quantity of the available data slots of the plurality of data slots 154 are assigned to, or correspond with, slot types containing audio data 132. Similarly, voice-centric data slot template 160 corresponds to a potential bit rate allocation where a larger quantity of the available data slots of plurality of data slots 154 are assigned to or correspond with slot types containing voice data 130.

Figure 4A:
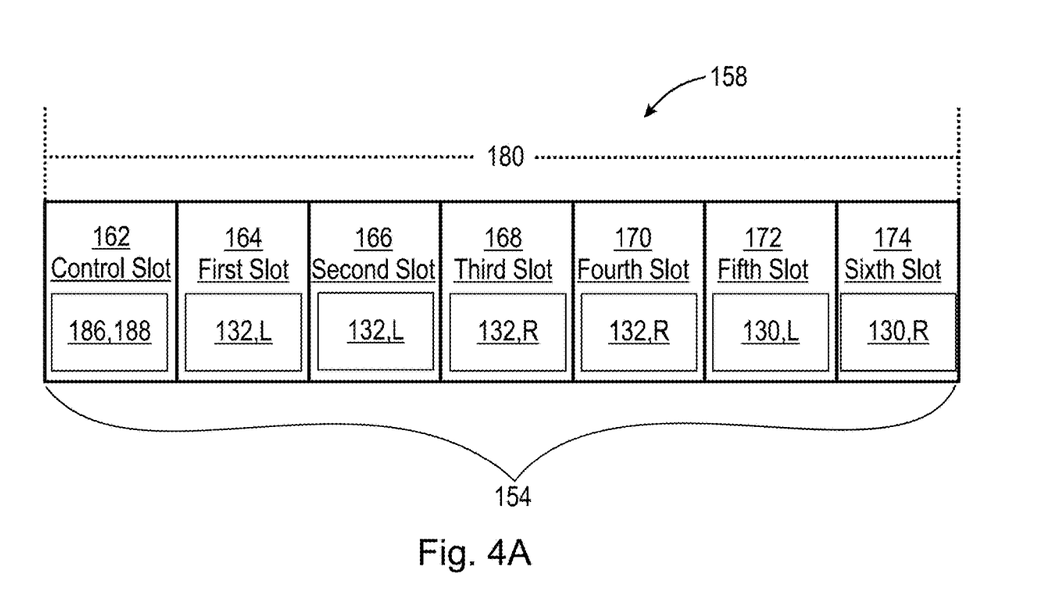
FIG. 4A is a schematic illustration of an audio-centric data slot template according to the present disclosure.
Figure 4B:
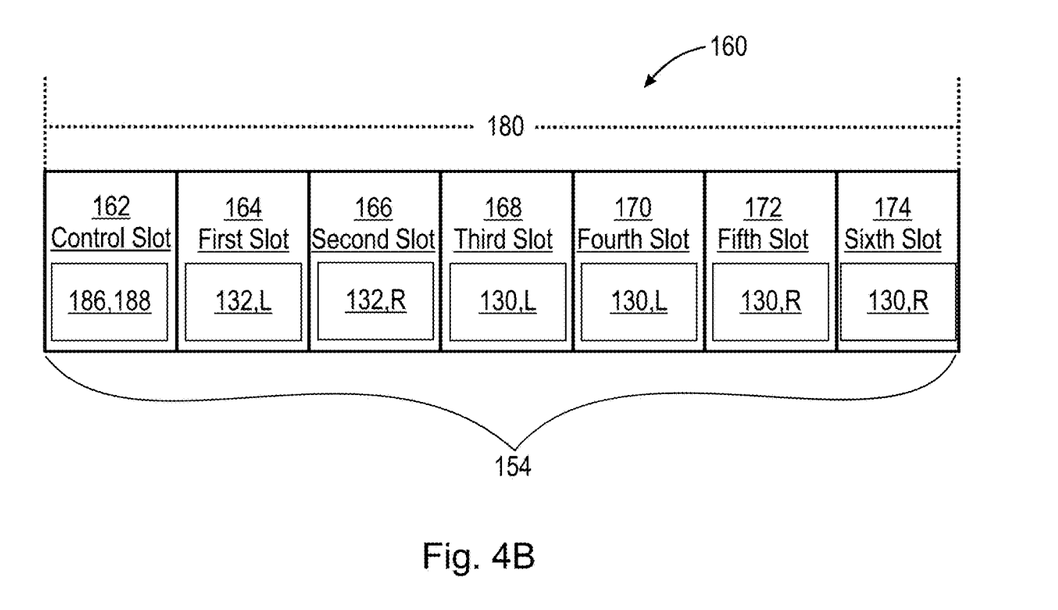
FIG. 4B is a schematic illustration of a voice-centric data slot template according to the present disclosure.

As illustrated in FIGS. 4A-4B, audio-centric data slot template 158 and voice-centric data slot template 160 can contain plurality or data slots 154 within a given data frame (e.g., first data frame 180 discussed below) of plurality of data frames 152, e.g., seven individual data slots where each data slot can be assigned to data corresponding to any of the slot types discussed above. The slots can include a control slot and six data slots, i.e., control slot 162, first data slot 164, second data slot 166, third data slot 168, fourth data slot 170, fifth data slot 172, and sixth data slot 174. Control slot 162 can include various control information related to first connection 146 and/or first communication protocol 148 which can be utilized by the devices of audio system 100 to establish or maintain first data stream 150 and/or first connection 148. For example, control slot 162 may include increment data 186 and/or template data 188 as discussed below.

As illustrated in FIG. 4A, audio-centric data slot template 158 can be established such that a majority of, or a larger number of, the slots of the available plurality of data slots 154 are assigned to or correspond to audio data 132. For example, audio-centric data slot template 158 can have a control slot 162 as discussed above, and: first data slot 164 can be assigned to audio data 132 corresponding to a left earcup L; second data slot 166 can also be assigned to audio data 132 corresponding to a left earcup L; third data slot 168 can be assigned to audio data 132 corresponding to a right earcup R; fourth data slot 170 can also be assigned to audio data 132 corresponding to a right earcup R; fifth data slot 172 can be assigned to voice data 130 corresponding to a left earcup L; and sixth data slot 174 can be assigned to voice data 130 corresponding to a right earcup R. In this audio-centric slot template 158, there are a total of four data slots, i.e., data slots 162-168, which are assigned to audio data 132, while only two data slots are assigned to voice data 130. It should be appreciated that slots of the same data type may be fused together, i.e., transmitted together via first communication protocol 148. Furthermore, it should be appreciated that audio data 132 and/or voice data 130 does not need to be divided between left and right headphones of first wearable audio device 102 as discussed above, and that only one earcup/speaker is needed. In the event only one speaker or earcup is used the foregoing slot assignments of audio-centric slot template 158 need only utilize three data slots where a majority of the slots, i.e., two slots, are assigned to audio data 132.

As illustrated in FIG. 4B, voice-centric data slot template 160 can be established such that a majority of, or a larger number of, the slots of the available plurality of data slots 154 are assigned to or correspond to voice data 130. For example, voice-centric data slot template 160 can have a control slot 162 as discussed above, and: first data slot 164 can be assigned to audio data 132 corresponding to a left earcup L; second data slot 166 can be assigned to audio data 132 corresponding to a right earcup R; third data slot 168 can be assigned to voice data 130 corresponding to a left earcup L; fourth data slot 170 can also be assigned to voice data 130 corresponding to a left earcup L; fifth data slot 172 can be assigned to voice data 130 corresponding to a right earcup R; and sixth data slot 174 can be also be assigned to voice data 130 corresponding to a right earcup R. In this voice-centric slot template 160, there are a total of four data slots, i.e., data slots 168-174, which are assigned to voice data 130, while only two data slots are assigned to audio data 132. It should be appreciated that slots of the same data type may be fused together, i.e., transmitted together via first communication protocol 148. Furthermore, it should be appreciated that audio data 132 and/or voice data 130 do not need to be divided between left and right earcups of first wearable audio device 102 as discussed above, and that only one earcup/speaker is needed. In the event only one speaker or earcup is used the foregoing slot assignments of voice-centric slot template 160 need only utilize three data slots where a majority of the slots, i.e., two slots, are assigned to voice data 130.

Figure 4C:
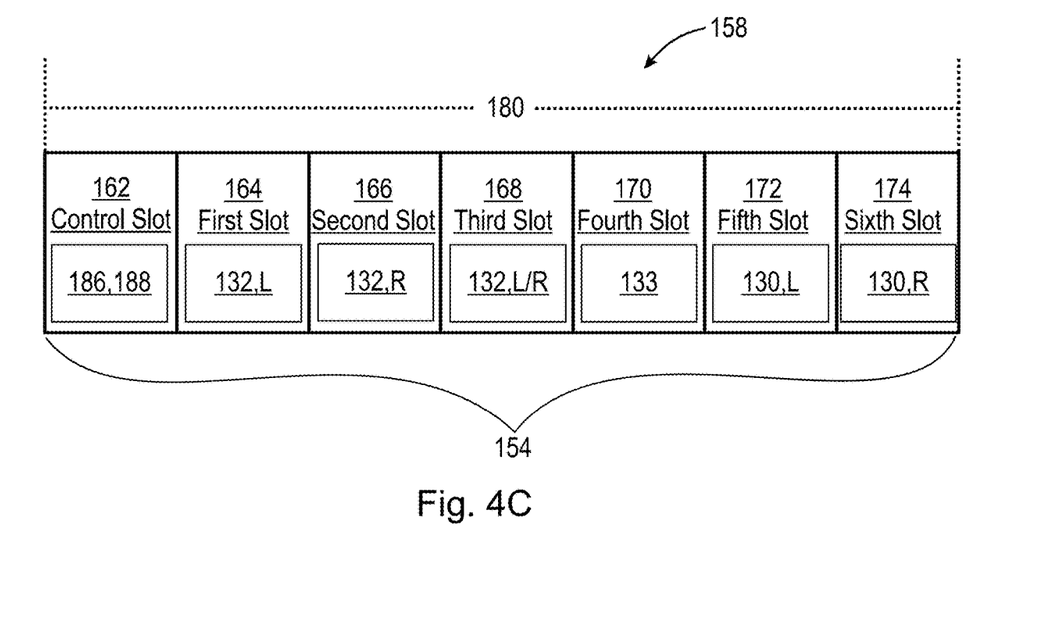
FIG. 4C is a schematic illustration of an audio-centric data slot template according to the present disclosure.
Figure 4D:
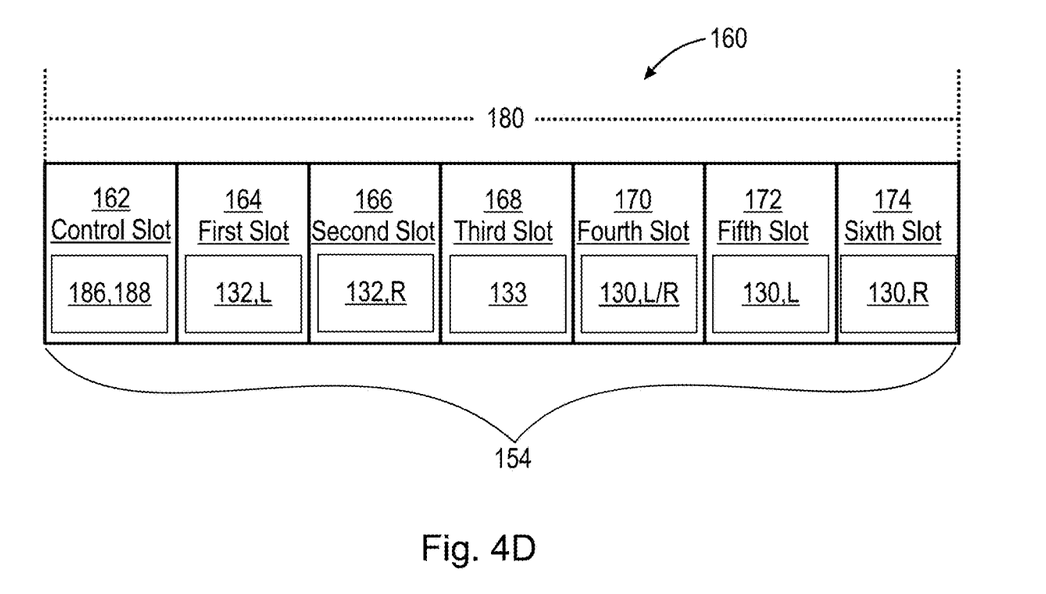
FIG. 4D is a schematic illustration of a voice-centric data slot template according to the present disclosure.

In one example, illustrated in FIGS. 4C and 4D, audio-centric data slot template 158 and voice-centric data slot template 160 may be arranged such that at least one slot of each respective template corresponds to, or is assigned to, sensor data 133 obtained from additional sensor 128 as discussed above. For example, audio-centric data slot template 158 can have a control slot 162 as discussed above, and: first data slot 164 can be assigned to audio data 132 corresponding to a left earcup L; second data slot 166 can also be assigned to audio data 132 corresponding to a right earcup L; third data slot 168 can be assigned to audio data 132 corresponding to the left earcup, right ear cup, or both ear cups; fourth data slot 170 can be assigned to sensor data 133 obtained from additional sensor 128; fifth data slot 172 can be assigned to voice data 130 corresponding to a left earcup L; and sixth data slot 174 can be assigned to voice data 130 corresponding to a right earcup R. Thus, audio-centric data slot template 158 contains three slots assigned to audio data 132, one slot assigned to sensor data 133, and two slots assigned to voice data 130. Additionally, voice-centric data slot template 160 can have a control slot 162 as discussed above, and: first data slot 164 can be assigned to audio data 132 corresponding to a left earcup L; second data slot 166 can be assigned to audio data 132 corresponding to a right earcup R; third data slot 168 can be assigned to sensor data 133 obtained from additional sensor 128; fourth data slot 170 can be assigned to voice data 130 corresponding to a left earcup L, right earcup R, or both ear cups; fifth data slot 172 can be assigned to voice data 130 corresponding to a right earcup R; and sixth data slot 174 can be also be assigned to voice data 130 corresponding to a right earcup R. Thus, voice-centric data slot template 160 contains three slots assigned to voice data 130, one slot assigned to sensor data 133, and two slots assigned to audio data 132.

Figure 4E:
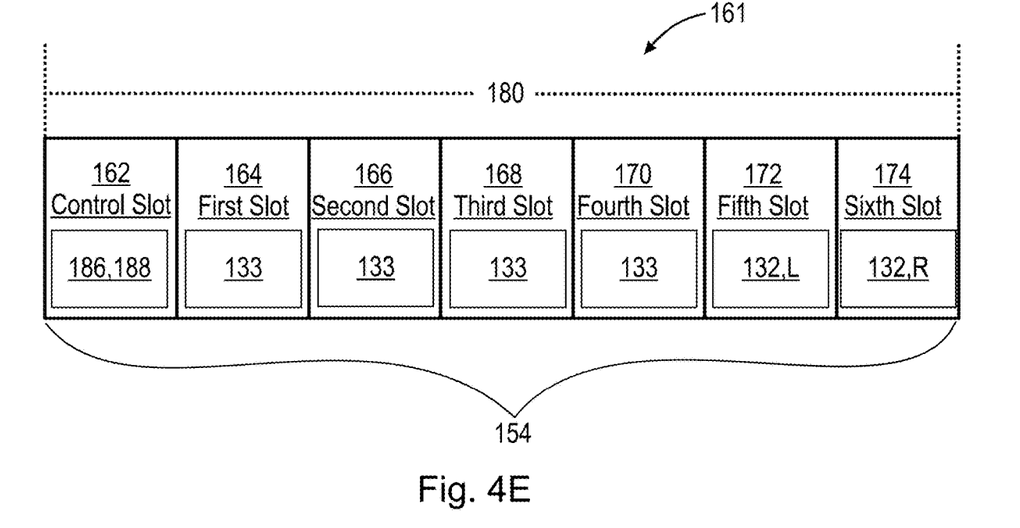
FIG. 4E is a schematic illustration of a sensor-centric data slot template according to the present disclosure.
Figure 4F:
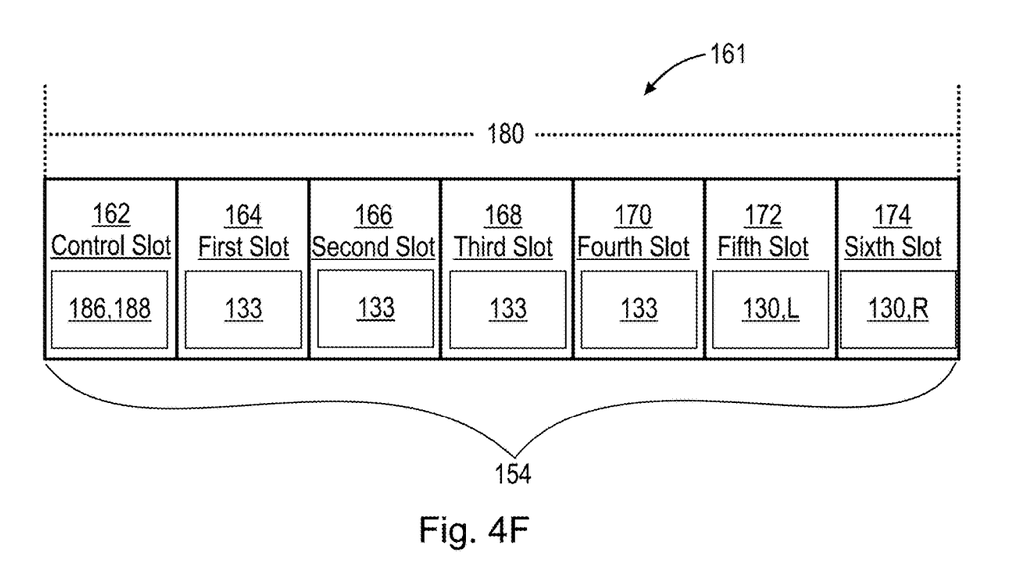
FIG. 4F is a schematic illustration of a sensor-centric data slot template according to the present disclosure.

Additionally, it should be appreciated that plurality of data slot templates 156 may further include a sensor-centric data slot template 161. As illustrated in FIGS. 4E and 4F, sensor-centric data slot may be arranged such that the majority of slots within the template correspond to, or are assigned to, sensor data 133 obtained from additional sensor 128 and the remaining slots correspond to audio data 132. For example, as illustrated in FIG. 4E, sensor-centric slot template 161 can have a control slot 162 as discussed above, and: first data slot 164, second data slot 166, third data slot 168; and fourth data slot 170 can be assigned to sensor data 133 obtained from additional sensor 128; fifth data slot 172 can be assigned to audio data 132 corresponding to a left earcup L; and sixth data slot 174 can be assigned to audio data 132 corresponding to a right earcup R. Thus, sensor-centric data slot template 161 contains four slots assigned to sensor data 133 and two slots assigned to audio data 132. Alternatively, as illustrated in FIG. 4F, sensor-centric data slot template 161 data slot may be arranged such that the majority of slots within the template correspond to, or are assigned to, sensor data 133 obtained from additional sensor 128 and the remaining slots correspond to voice data 130. For example, as illustrated in FIG. 4E, sensor-centric slot template 161 can have a control slot 162 as discussed above, and: first data slot 164, second data slot 166, third data slot 168; and fourth data slot 170 can be assigned to sensor data 133 obtained from additional sensor 128; fifth data slot 172 can be assigned to voice data 130 corresponding to a left earcup L; and sixth data slot 174 can be assigned to voice data 130 corresponding to a right earcup R. Thus, sensor-centric data slot template 161 contains four slots assigned to sensor data 133 and two slots assigned to voice data 130.

It should be appreciated that plurality of data slot templates 156 can further include slot templates which utilize any conceivable combination of the slot types discussed above. For example, it is conceivable that plurality of data slot templates 156 can include and audio-only data slot template or a voice-only audio data slot template, where all six data slots of plurality of data slots 154 are assigned to audio data 132 or voice-data 130, respectively. Additionally, a balanced data slot template having, e.g., two slots assigned to voice data 130, two slots assigned to audio data 132 and two slots assigned to sensor data 133 is contemplated herein.

Presumably, when the user is not speaking, the user would like a higher quality audio experience, i.e., a higher bit rate with respect to audio data 132. Additionally, while a user is speaking, i.e., when first wearable audio device 102 or first peripheral device 104 are receiving voice input 122, it is likely that the user is less concerned with the audio quality. To account for these interests, the various devices discussed above, e.g., first wearable audio device 102 and first peripheral device 104 are arranged to operate in a critical listening state 176 and a non-critical listening state 178. The critical listening state 176 defines a state where no voice input 122 is received and no voice data 130 is being sent and/or received between first wearable audio device 102 and first peripheral device 104. The non-critical listening state 178 defines a state of audio system 100 where voice input 122 is being received and voice data 130 is being sent and/or received between first wearable audio device 102 and first peripheral device 104. It should be appreciated that any sensor input discussed herein could be used to indicate when the user would like to transition between listening states, e.g., any input to first sensor 120, second sensor 144, or additional sensor 128 can act as a triggering event that indicates that the devices in audio system 100 should switch or begin to transition between listening states.

It should also be appreciated that, while in the critical listening state 176 and/or the non-critical listening state 178, an input, e.g., from additional sensor 128, may act as a triggering event to switch from, for example, voice-centric data slot template 160 or audio-centric data slot template 158 to sensor-centric data slot template 161. As mentioned above, sensor data 133 obtained from additional sensor 128 may for example register a gesture or acceleration of first wearable audio device and utilize that data to trigger a switch in data slot templates as discussed herein. Additionally, although the foregoing description is directed to bi-directional communications between two devices, i.e., first wearable audio device 102 and first peripheral device 104 where the communications are substantially the same in both directions of communication, it should be appreciated that audio system 100 can be arranged to transmit using any conceivable combination of data slot templates discussed above in the two directions of communication. For example, communications sent from first wearable audio device 102 to first peripheral device 104 may utilize, e.g., voice-centric data slot template 160 where four of the six data slots are assigned to voice data 130 and two slots are assigned to sensor data while communications sent from first peripheral device 104 to first wearable audio device 102 may utilize, e.g., audio-centric data slot template 158.

Furthermore, each device of audio system 100 may be arranged to transition from critical listening state 176 and non-critical listening state 178 over plurality of data frames 152. Alternatively, each device of audio system 100 may be arranged to transition from noncritical listening state 178 to critical listening state 176 over plurality of data frames 152. In one example, critical listening state 176 corresponds to an audio-centric data slot template 158 and non-critical listening state 178 corresponds to a voice-centric data slot template 160. Thus a transition from the critical listening state 176 to non-critical listening state 178 is effectively a transition from audio-centric data slot template 158 to voice-centric data slot template 160. For example, plurality of data frames 152 can include first data frame 180, second data frame 182, and third data frame 184. Each data frame of plurality of data frames 152 can include a data slot template of plurality of data slot templates 156, e.g., audio-centric data slot template 158 and voice-centric data slot template 160. Importantly, control slot 162 of each data slot template can include increment data 186 and/or template data 188 (shown in FIGS. 4A-4B). Increment data 186 defines data or information used during the transition of the data slots templates discussed above, which indicates to each device of audio system 100 which receives data over first communication protocol 148 the number of future data frames of plurality of data frames 152 that communications will maintain their current data slot template before a switch to a different data slot template configuration. Additionally, template data 188 corresponds to a data value which indicates the current data slot template and/or the next data slot template which is to be utilized after the next transition. For example, first data frame 180 may correspond to an audio-centric data slot template 158 where control slot 162 contains increment data 186, where increment data corresponds to the integer "2," and template data 188 indicates the current data slot template is an audio-centric data slot template 158 and the new data slot template to be used is a voice-centric audio data slot template 160. During the transition between listening states and/or data slot templates, discussed herein and schematically illustrated in FIG. 5, each subsequent data frame may decrement the increment data 186 one full integer value, and when increment data 186 equals "0" every device currently using the audio-centric data slot template 158 will begin to use voice-centric data slot template 160. It should be appreciated that template data 188 may be stored within each device of audio system 100, e.g., within first memory 116 of first wearable audio device 102 and/or second memory 140 of first peripheral device 104. Additionally, it should be appreciated that template data 188 may utilize a predefined look-up table of data values which maps each potential data slot template to an integer value or short string of data to reduce the amount of required data to maintain this information in each communication. Utilization of increment data 186 and template data 188 allows for each device within audio system 100 to transition at the same time, i.e., within the same data frame, preventing data loss between devices having different data slot templates. As recited in the example above, the decrementing of increment data 186 described above may start with a non-zero integer value. The initial value of increment data 186 is a representation of the number of bytes, for example, that the encoder has already encoded but has not transmitted yet. This way, the starting integer value for increment data 186 matches the number bytes of encoded data that have not been encoded using the new data slot template. Thus, any packets of data having used, e.g., voice-centric data slot template 160 for encoding may be sent using the old encoding scheme and will time up the switch to the new data slot template, e.g., audio-centric slot template 158.

During operation of audio system 100, first communication module 108 of first wearable audio device 102 and/or second communication module 134 of first peripheral device 104 are arranged to establish a simultaneous bi-directional communication connection, i.e., first connection 146, to send voice data 130 and audio data 132 between first wearable audio device 102 and first peripheral device 104. First connection 146 between first wearable audio device 102 and first peripheral device 104 is established via a first protocol, i.e., first communication protocol 148. First connection 146 may be utilized to establish first data stream 150. Initially, the devices within audio system 100 may be in a critical listening state 176, i.e., where the user would like an enhanced audio experience, and therefore, first data stream 150 may utilize audio-centric data slot template 158 or an audio-only data slot template (i.e., where first data stream 150 is utilized to send and receive only audio data 132). Upon receiving voice input 122 from first sensor 120 of first wearable audio device 102, additional sensor 128, and/or second sensor 144 of first peripheral device, first sensor 120 or second sensor 144 are arranged to switch from inactive state 126 to active state 124 and generate, e.g., voice data 130. The switch from inactive state 126 to active state 124 and/or the receipt of voice data 130 is utilized by, for example, first peripheral device 104 to direct all devices (e.g., first wearable audio device 102) connected to audio system 100 to switch from critical listening state 176 to a non-critical listening state 178. In one example, the switch from the critical listening state to the non-critical listening state 178 may correspond to a switch from audio-centric data slot template 158 or an audio-only data slot template, to voice-centric data slot template 160 or a voice-only data slot template.

As discussed above, the transition from audio-centric data slot template 158 to voice-centric data slot template 160 may take place over a plurality of data frames, where each data frame is sent or received sequentially. For example, within first data frame 180, control slot 162 has increment data 186 corresponding to the integer "2", and template data 188 indicates the current data template is audio-centric data slot template 158 and the future data template is voice-centric data slot template 160. Within second data frame 182, which is sent or received after first data frame 180, increment data 186 is decremented one integer value and is now the integer "1" and template data 188 indicates the current data template is audio-centric data slot template 158 and the future data template is voice-centric data slot template 160. Within third data frame 184, which is sent or received after second data frame 182, increment data 186 is decremented one integer value and is now "0". Since increment data 186 indicates the integer value "0", template data 188 now indicates the current data slot template is voice-centric data template 160 and the future slot template can correspond to any one of the other data slot templates of plurality of data slot templates 156. Thus, after the foregoing transition, the user will experience an enhanced or heightened bit rate for voice data 130 when the user is speaking, and a heightened bit rate for voice data 130 when the user is speaking. It should be appreciated that 2 or more data frames may be used in the transition between listening states described herein. Additionally, in the event that more data frames are utilized a proportional amount of integers may be utilized to decrement during each subsequent data frame such that all devices receiving these communications may transition simultaneously without data loss.

It should be appreciated that an equivalent transition can take place when transitioning from, for example, voice-centric data slot template 160 to audio-centric data slot template 158. In one example, after a predetermined amount of time or predetermined amount of data frames where no voice input 122 or voice data 130 is received by first sensor 120 and/or second sensor 144, i.e., the user is not speaking, it may be desirable to switch or transition back to a critical listening state 176 from non-critical listening state 178. In other words, after a predetermined amount of time, it may be desirable to switch back from the voice-centric data slot template 160 to audio-centric data slot template 158. Audio system 100 may utilize a similar transition as described above with respect to first data frame 180, second data frame 182, and third data frame 184, such that all devices in audio system 100 transition from voice-centric data slot template 160 back to audio-centric data slot template 158. It should also be appreciated that, after or between each of the foregoing transitions between data slot templates, template data 188 does not need to indicate a future data slot template and can be left blank.

Figure 6:
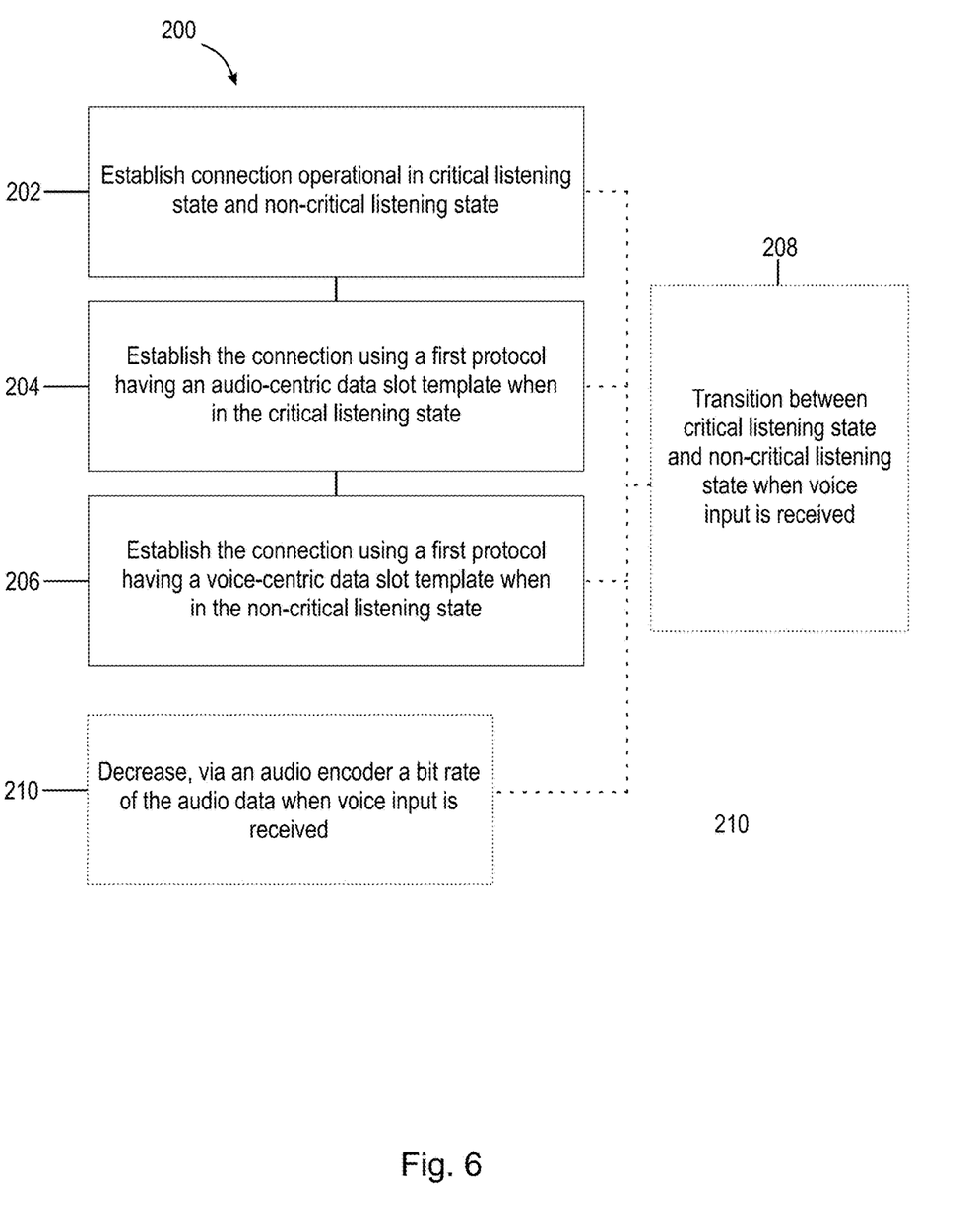
FIG. 6 is a flow chart illustrating the steps of a method according to the present disclosure.

FIG. 6 illustrates a method according to the present disclosure, i.e., method 200. Method 200 can include, for example: establishing a first connection 146 between a first wearable audio device 102 and a first peripheral device 104, the first wearable device 102 or the first peripheral device 104 being operational in a critical listening state 176 and a non-critical listening state 178 (step 202); establishing, when the first wearable audio device 102 or the first peripheral device 104 is in the critical listening state 176, a first data stream 150 within the first connection 146, the first data stream 150 established using a first communication protocol 148, the first communication protocol 148 having an audio-centric data slot template 158 (step 204); and, establishing, when the first wearable device 102 or the first peripheral device 104 is in the non-critical listening state 178, the first data stream 150 within the first connection 148, the first data stream 150 established using the first communication protocol 148, the first communication protocol 148 having a voice-centric data slot template 160 (step 206). Optionally, method 200 may also include: transitioning the first wearable audio device 102 or first peripheral device 104 from the critical listening state 176 to the non-critical listening state 178 when the first sensor 120 receives the voice input 122 (step 208). An additional optional method step within method 200 includes: decreasing, via an audio encoder AE of the first wearable audio device 102, a bit rate of a first audio data 132 when the first sensor 120 receives the voice input 122 (step 210).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of data management, the method comprising:
    establishing a first connection between a first wearable audio device and a first peripheral device, the first wearable audio device or the first peripheral device being operational in a critical listening state and a non-critical listening state;
    establishing, when the first wearable audio device or the first peripheral device is in the critical listening state, a first data stream within the first connection, the first data stream established using a first communication protocol, the first communication protocol having an audio-centric data slot template having a first bitrate associated with audio data and a second bitrate associated with voice data, and wherein the first bitrate is greater than the second bitrate; and,
    establishing, when the first wearable audio device or the first peripheral device is in the non-critical listening state, the first data stream within the first connection, the first data stream established using the first communication protocol, the first communication protocol having a voice-centric data slot template having the first bitrate associated with audio data and the second bitrate associated with voice data, and wherein the first bitrate is less than the second bitrate.

2. The method of claim 1, wherein the first wearable audio device or first peripheral device further comprises a first sensor arranged to receive a voice input.

3. The method of claim 2, further comprising:
transitioning the first wearable audio device or first peripheral device from the critical listening state to the non-critical listening state when the first sensor receives the voice input.

4. The method of claim 3, wherein the transitioning occurs over a plurality of data frames.

5. The method of claim 2, further comprising:
decreasing, via an audio encoder of the first wearable audio device, a bit rate of a first audio data when the first sensor receives the voice input.

6. The method of claim 1, wherein the audio-centric data slot template or the voice-centric data slot template comprises at least one slot corresponding to sensor data from another sensor located on or in the portable electronic device.

7. The method of claim 1, wherein the audio-centric data slot template and the voice-centric data slot template comprise a plurality of data slots, where each data slot is associated with voice data obtained from a first sensor on the first peripheral device or the first wearable audio device, or audio data obtained from the first peripheral device.

8. The method of claim 7, wherein the audio-centric data slot template comprises a first data slot corresponding to a first audio data, a second data slot corresponding to a second audio data, and a third data slot corresponding to a first voice data.

9. The method of claim 7, wherein the voice-centric data slot template comprises a first data slot corresponding to a first audio data, a second data slot corresponding to a first voice data, and a third data slot corresponding to a second voice data.

10. The method of claim 1, wherein the first peripheral device comprises:
a first processor and a first memory arranged to execute and store, respectively, a set of non-transitory computer readable instructions, the first memory further arranged to store the audio-centric data slot template and the voice-centric data slot template.

11. The method of claim 10, wherein the first peripheral device is arranged to send a control packet to the first wearable audio device indicating that the first peripheral device is using the audio-centric data slot template or the voice-centric data slot template.

12. An audio system for managing data, the system comprising:
a first wearable audio device arranged to connect, via a first connection, to a first peripheral device, the first connection comprising a first data stream over a first protocol, the first data stream arranged to utilize a voice-centric data slot template or an audio-centric data slot template;
wherein, at least the first wearable audio device is arranged to operate in a critical listening state or a non-critical listening state where the critical listening state corresponds with the audio-centric data slot template and the non-critical listening state corresponds with the voice-centric data slot template, wherein the audio-centric data slot template includes a first bitrate associated with audio data and a second bitrate associated with voice data wherein the first bitrate is greater than the second bitrate, and wherein the voice-centric data slot template includes the first bitrate associated with audio data and the second bitrate associated with voice data wherein the first bitrate is less than the second bitrate.

13. The audio system of claim 12, wherein the first wearable audio device or first peripheral device further comprises a first sensor arranged to receive a voice input.

14. The audio system of claim 13, wherein the first wearable audio device and the first peripheral device are arranged to transition from the critical listening state to the non-critical listening state when the first sensor receives the voice input.

15. The audio system of claim 14, wherein the transition occurs over a plurality of data frames.

16. The audio system of claim 13, wherein the first wearable audio device comprises an audio encoder, the audio encoder arranged to decrease a bit rate of a first audio data when the first sensor receives the voice input.

17. The audio system of claim 12, wherein the audio-centric data slot template and the voice-centric data slot template comprise a plurality of data slots, where each data slot is associated with voice data obtained from a sensor on the first peripheral device or the first wearable audio device, or audio data obtained from the first peripheral device.

18. The audio system of claim 17, wherein the audio-centric data slot template comprises a first data slot corresponding to a first audio data, a second data slot corresponding to a second audio data, and a third data slot corresponding to a first voice data.

19. The audio system of claim 17, wherein the voice-centric data slot template comprises a first data slot corresponding to a first audio data, a second data slot corresponding to a first voice data, and a third data slot corresponding to a second voice data.

20. The system of claim 1, wherein the audio-centric data slot template or the voice-centric data slot template comprises at least one slot corresponding to sensor data from another sensor located on or in the portable electronic device.

21. The audio system of claim 12, wherein the first peripheral device comprises:
a first processor and a first memory arranged to execute and store, respectively, a set of non-transitory computer readable instructions, the first memory further arranged to store the audio-centric data slot template and the voice-centric data slot template.

22. The audio system of claim 21, wherein the first peripheral device is arranged to send data from a control slot to the first wearable audio device indicating that the first peripheral device is using the audio-centric data slot template or the voice-centric data slot template.

* * * * *